May 27, 1958  YOSHIOKI ISHIKAWA ET AL  2,836,776
CAPACITOR
Filed May 4, 1956

INVENTOR
Y. ISHIKAWA
Y. SASAKI
BY I. SATO
R.P. Morris
ATTORNEY

United States Patent Office 2,836,776
Patented May 27, 1958

2,836,776

CAPACITOR

Yoshioki Ishikawa, Yozo Sasaki, and Ichiro Sato, Minato-ku, Tokyo, Japan, assignors to Nippon Electric Company Limited, Minato-ku, Tokyo, Japan, a corporation of Japan Application May 4, 1956, Serial No. 582,720

Claims priority, application Japan May 7, 1955

6 Claims. (Cl. 317—242)

This invention relates to a capacitor, and particularly to a capacitor in which the dielectric is a semiconductor.

Capacitors are known in which the anode comprises a metal such as tantalum, titanium or aluminum, which metal is oxidized to form a layer of dielectric, and a cathode consisting of a piece of paper impregnated with an electrolyte.

Although this type of electroytic condenser has the advantage of possessing large capacity with small size, the disadvantages are, the difficulty in operating at high or low temperatures because the characteristics of the electrolyte are materially affected thereby, deterioration occurring while service is discontinued, and inferior frequency characteristics resulting from poor ion mobility.

It is an object of this invention to provide a small-size dry type capacitor with a large capacity and favorable temperature characteristics.

In acordance with the invention there is provided a capacitor consisting of a metal that can be oxidized, such as tantalum, titanium, or aluminum; the oxide film on the metal being divided into layers and serving respectively as an intrinsic and an N-type semiconductor. A solid semiconductor substance, such as germanium, is applied to the intrinsic semiconductor, and at the surface boundary therebetween, there is formed a P-type surface state.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
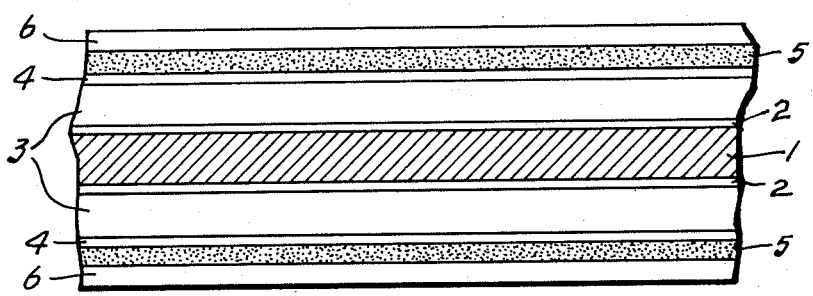
Figure 1 is an enlarged view of the capacitor shown in cross-section.

Referring to Figure 1, 1 denotes, for instance, a tantalum plate with thin layers of tantalum oxide 2 and 3 formed by any suitable conventional anodic oxidation treatment of the surface of the plate 1. The tantalum oxide layer 2 constitutes an N-type layer, and the layer 3 constitutes an intrinsic semiconductor layer. It is believed that the layer of tantalum oxide 2 near the tantalum metal is N-type (which we confirmed by measuring its thermoelectromotive force) and as the oxide is increased in thickness, which is a function of the formation voltage, the layer 3 further removed from the surface boundary becomes an intrisic semiconductor.

Now, if a P-type tantalum oxide layer is produced on the surface of the tantalum oxide 3 which constitutes the intrinsic semiconductor, the tantalum oxide would constitute the junction-type rectifier of P-intrinsic-N-type semiconductors, and when a voltage is applied in the reverse direction to the rectifier the potential drop will exist in the intrinsic semiconductor region. Thus, the capacity of the rectifier is determined mainly by the thickness of the intrinsic region, the surface area, and the dielectric onstant of the intrinsic semiconductor.

In the case of the electrolytic condenser, it is believed that the ions in the electrolyte are absorbed by the oxide film, thus producing a P-type layer.

We have discovered, however, that a P-type thin layer can be produced by means other than the ions in the electrolyte.

For example in Figure 1, 5 denotes an evaporated layer of pure germanium which is a P-type semiconductor.

By the interaction between the said evaporated germanium film and the intrinsic tantalum oxide, the surface of tantalum oxide is changed into P-type. This phenomenon is known in the case of N-type germanium by the name of P-type surface state.

The formation of P-type surface state thus produced is illustrated by 4 of Fig. 1.

When the evaporated layer of germanium is used as a P-type semiconductor, as in this example, the layer manifests large electric resistance. This phenomenon makes it desirable to cover the surface of the evaporated layer 5 with a thin metallic layer 6 of small electric resistance. Then, the capacitor will constitute the junction-type rectifier of P–I–N, making the metallic film 6 one pole while the tantalum 1 is the other.

Figure 2:
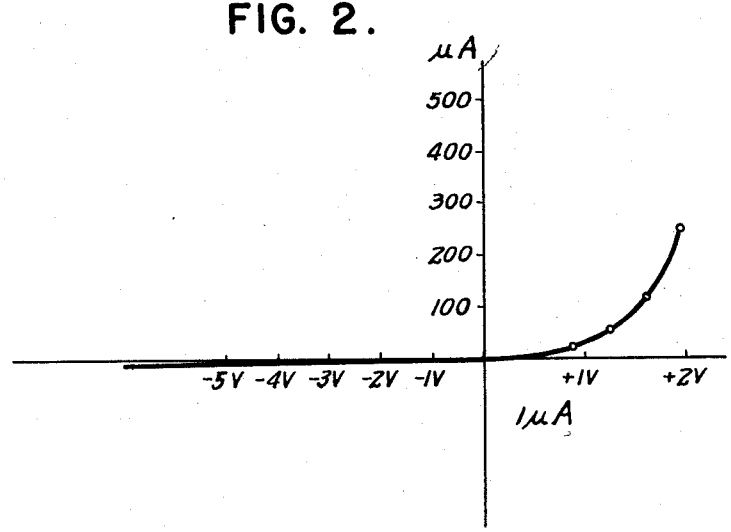
Figure 2 is a curve showing the voltage-current characteristics of the capacitor.

Figure 2 shows an example of the rectification characteristics of this condenser; the plus or minus sign of the voltage, as indicated on the graph, corresponding to the polarity of the voltage applied to the thin metallic layer electrode 6. The current in the opposite direction is below 0.1 $\mu$a. The rectification characteristics, especially of the current in the forward direction, is largely determined by the thickness of the intrinsic semiconductor layer.

A numerical example of the condenser for this invention is shown as follows. A tantalum foil (33 x 75 mm.) with a thickness of 0.014 mm. is thoroughly washed and immersed in an aqueous solution of ammonium carbonate of about 7% concentration, and a voltage is applied so that the anodic oxidation takes place at a current density of 4 ma./cm.$^2$, gradually raising the voltage up to 10 volts. After the formation is acomplished, which takes about one hour, the foil is removed, thoroughly washed and dried.

Upon the surface, purest germanium (more than 99.999% pure), is deposited through evaporation in a vacuum of a degree of $10^{-4}$ mm. Hg, and further aluminum is deposited by means of evaporation. A measurement made with the tantalum foil as the anode and the aluminum film as the cathode, indicates that the leakage current is below 0.1 $\mu$a. at 7 volts and the capacity is between 2 and 3 $\mu$f, the said capacity being approximately the same as that of the electrolytic condenser manufactured by using the said tantalum plate. The breakdown voltage of the said condenser lies between 9 and 10 volts which is approximately equal to the anodic oxidation voltage.

As is readily understood from the above example, the condenser made in accordance with this invention is not only possessed with the same advantages as the electrolytic condenser, but also it can operate at extremely high or low temperatures, due to the absence of an electrolyte, and further can eliminate such defects as degeneration of the frequency characteristics and deterioration while service is discontinued, both of which come from the use of an electrolyte.

While we have described above the principles of our invention in connection with specific apparatus, it is to be clearly understood that this description is made only by way of example and not as a limitation to the scope of our invention.

What is claimed is:

1. A capacitor comprising a sheet of metal oxydizable to form an anodic oxydation film, an anodic oxydation film of said metal on the surface of said sheet, said film being divided into a layer of N-type semiconductor next to said sheet and a layer of intrinsic semiconductor upon said layer of N-type semiconductor, and a layer of a solid semiconductor substance upon said layer of intrinsic semiconductor of such character that the surface of said oxydation film is changed to the P-type surface state.

2. A capacitor, according to claim 1, wherein the said solid substance is a film made by vacuum evaporation.

3. A capacitor, according to claim 1, wherein the said solid substance is a film made by vacuum evaporation of germanium.

4. A capacitor, according to claim 1, further comprising a film made by vacuum evaporation of metal with small resistance on the surface of the P-type semiconductor thereby reducing the series resistance of the said capacitor.

5. A capacitor, according to claim 1, in which the metal of the sheet is one of the group of tantalum, titanium, and aluminum.

6. A capacitor comprising a sheet of tantalum, an anodic oxydation film on the surface of said sheet, a layer of pure germanium on said anodic oxydation film, and a layer of aluminum on said layer of germanium, said layers of germanium and aluminum having been applied by evaporation.

References Cited in the file of this patent

UNITED STATES PATENTS

| | | |
|---|---|---|
| 1,906,691 | Lilienfeld | May 2, 1933 |
| 1,925,307 | De Boer et al. | Sept. 5, 1933 |
| 2,633,543 | Howatt | Mar. 31, 1953 |